United States Patent [19]

Ueno

[11] Patent Number: 5,226,830
[45] Date of Patent: Jul. 13, 1993

[54] CONNECTOR DEVICE

[75] Inventor: Seiichi Ueno, Tokyo, Japan

[73] Assignee: The Furukawa Electric Co., Ltd., Tokyo, Japan

[21] Appl. No.: 893,334

[22] Filed: Jun. 3, 1992

[30] Foreign Application Priority Data

Jun. 4, 1991 [JP] Japan .................. 3-132797

[51] Int. Cl.⁵ ........................... H01R 39/02
[52] U.S. Cl. ........................ 439/164; 439/15
[58] Field of Search ...................... 439/15, 164

[56] References Cited

U.S. PATENT DOCUMENTS 4,744,763 5/1988 Suzuki et al. ............ 439/164 X
5,032,084 7/1991 Schauer ................... 439/164 X
5,151,042 9/1992 Okada ..................... 439/164

Primary Examiner—Eugene F. Desmond
Attorney, Agent, or Firm—Frishauf, Holtz, Goodman & Woodward

[57] ABSTRACT

A connector device is provided in which a flexible belt-shaped transmission line wound in spiral form and including a plurality of electrical conductors covered with an insulating material is housed in fixed and rotatable cases which are relatively rotatably combined and define therein an annular space. A joining portion is formed on each of the rotatable and fixed cases, for connecting the electrical conductors of the belt-shaped transmission line to a terminal attached to an external electric wire.

3 Claims, 6 Drawing Sheets

CONNECTOR DEVICE

BACKGROUND OF THE INVENTION

1. Field of the Invention

This invention relates to a connector device for electrically connecting relatively rotatable members to each other.

2. Description of the Related Art

Connector devices for electrically connecting relatively rotatable members include, for example, a connector device for use in an air bag system mounted to a steering apparatus of an automobile.

In this type of connector devices, a flexible flat cable (belt-shaped transmission line) including a plurality of electrical conductors covered with an insulating material is wound in spiral form and housed in rotatable and fixed cases which are rotatable relative to each other, such that a relative rotation of these cases is permitted as the flat cable coils or uncoils. The flat cable is electrically connected to devices arranged outside of the connector device.

In such connector devices, therefore, when the flat cable is to be connected to devices outside the connector device, lead wires or an electric connector such as a connector housing, for example, is previously connected to an end of the flat cable, and the flat cable is housed in the cases, with the lead wires or connector housing located outside of the cases. Alternatively, after the flat cable is housed in the cases, an end thereof is extended to the outside of the connector device and connected to an external device via a special electric connector, or the electrical conductors of the flat cable are connected respectively to lead wires which are connected to an external device via an electric connector.

To connect the flat cable to a device outside the connector device, if, for example, lead wires or an electric connector is attached to the flat cable before the cable is housed in the cases, as mentioned above, handling of the flat cable is troublesome, and in some cases, the flat cable is bent when handled, thus forming a bend in the flat cable. In connector devices wherein a spirally wound flat cable is housed in cases and a smooth rotation of the cases is permitted by coiling and uncoiling of the flat cable, such a bend in the flat cable hinders the smooth rotation. Therefore, the flat cable must be handled with great care, and this hinders the mechanization of the assembling of connector devices.

On the other hand, in the case of connecting an electric connector or lead wires to an end of the flat cable after the flat cable is housed in the cases, the cases of the connector device may be rotated, and the order of assembling processes is restricted. Accordingly, the number of processes required for the assembling of the connector device cannot be reduced, and the assembling work cannot be mechanized or automated, requiring man power and making the work complicated.

SUMMARY OF THE INVENTION

An object of this invention is to provide a connector device which can be easily assembled, permits an assembling thereof to be mechanized or automated, and which can be easily connected to external devices.

To achieve the above object, this invention provides a connector device in Which a flexible belt-shaped transmission line wound in spiral form and including a plurality of electrical conductors covered with an insulating material is housed in fixed and rotatable cases which are relatively rotatably combined and define therein an annular space, the connector device being characterized by comprising a joining portion formed at each of the rotatable and fixed cases, for connecting the electrical conductors of the belt-shaped transmission line to a terminal attached to an external electric wire.

Preferably, the electrical conductors of the belt-shaped transmission line are connected directly to the terminal of the external electric wire, or via a connection terminal, at the joining portion.

Still preferably, a reinforcing member is fitted to each of the joining portions, for reinforcing a junction between the electrical conductors of the belt-shaped transmission line and the terminal of the external electric wire.

In the connector device of this invention, the belt-shaped transmission line can be easily connected to external electric wires by simply fitting the terminal of each external electric wire, which is previously processed as a wire harness, into the corresponding joining portion, whereby the connector device is easily connected to external devices. Accordingly, the connector device of this invention can be easily assembled, and the assembling work can be mechanized, thus enabling an automatic assembling. Further, the connection of the connector device to external devices is very easy, and the connection work can be carried out effortlessly even if the work space is small, whereby the efficiency of the connection work is enhanced.

The belt-shaped transmission line may have the electrical conductors thereof directly connected to the terminal of the external electric wire, or connected to same through connection terminals connected to the electrical conductors.

Furthermore, the junction of the electrical conductors of the belt-shaped transmission line with the terminal of the external electric wire can be reinforced by the reinforcing member attached to the joining portion.

The above and other objects, features, and advantages of this invention will become more apparent from the ensuing detailed description taken in conjunction with the accompanying drawings.

DETAILED DESCRIPTION OF THE PREFERRED EMBODIMENT

An embodiment of this invention will be described in detail with reference to FIGS. 1 through 9.

Figure 1:
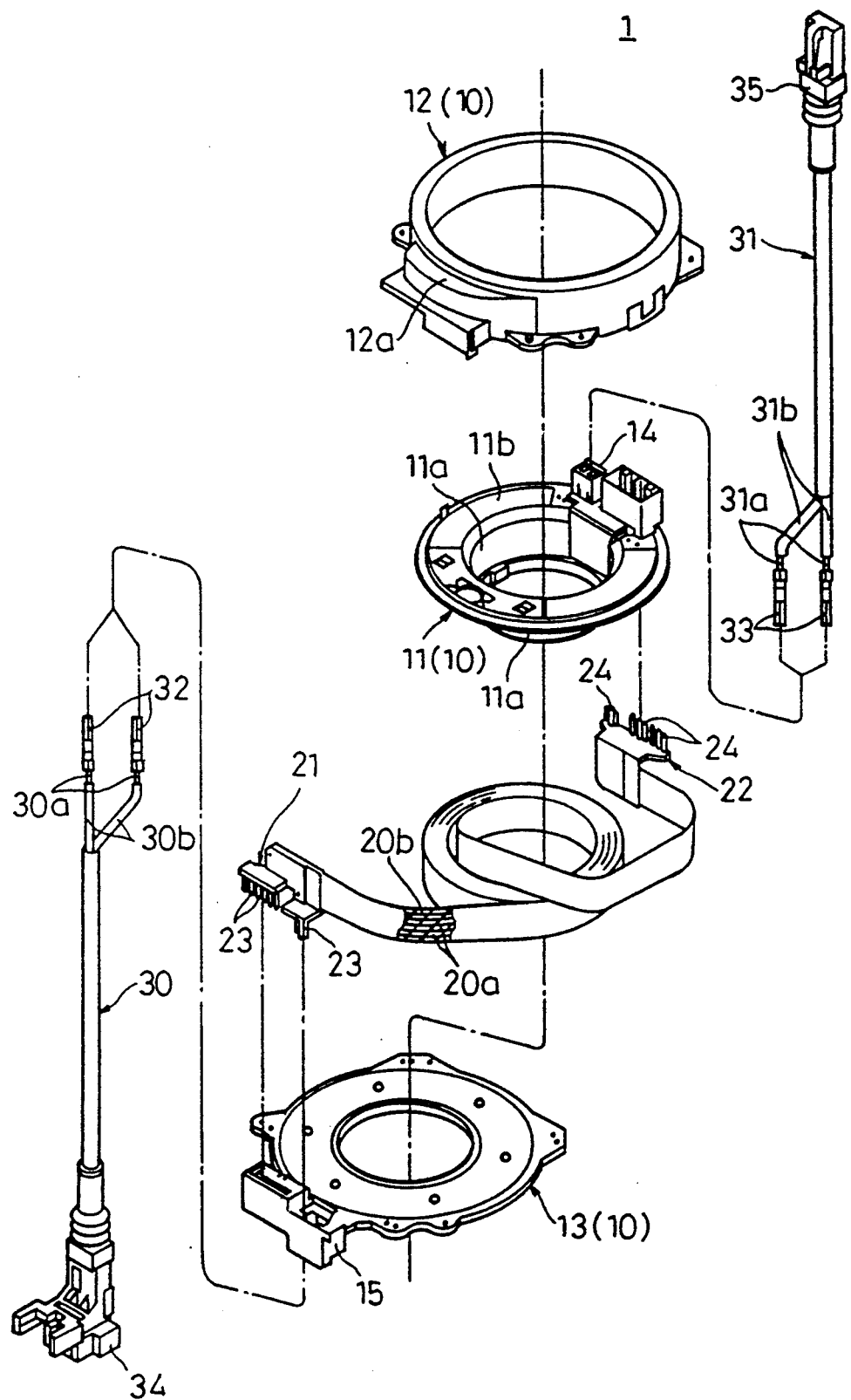
FIG. 1 is an exploded perspective view of a connector device according to this invention.

As shown in FIG. 1, a connector device 1 comprises a casing 10 composed of a pair of cases, and a flat cable 20 wound in spiral form and housed in the casing 10.

The casing 10 includes a rotatable case 11, a fixed case 12 surrounding and rotatably supporting the rotatable case 11, and a base plate 13, and these elements are assembled so as to be relatively rotatable and define therein an annular space. The base plate 13 is attached to a stationary member etc., together with the fixed case 12, and thus functions as the fixed case.

The rotatable case 11 has an inner cylindrical shaft portion 11a and a flange 11b extending radially outward from an upper end of the shaft portion 11a, and is mounted to a rotatable member, e.g., a steering column, with the steering column passed through the inner cylindrical shaft portion 11a. A joining portion 14 is formed on the flange 11b for a connection with an external electric wire 31.

Figure 4:
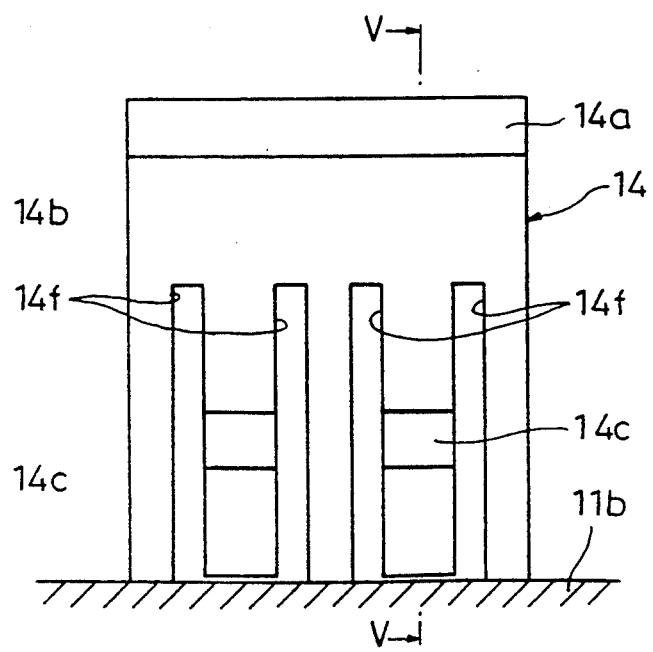
FIG. 4 is an enlarged side view of the joining portion formed on the rotatable case.
Figure 5:
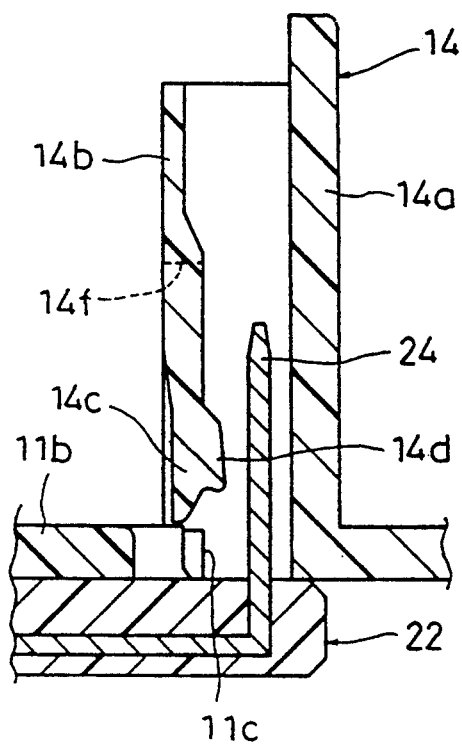
FIG. 5 is a sectional view of the joining portion taken along line V—V in FIG. 4.
Figure 6:
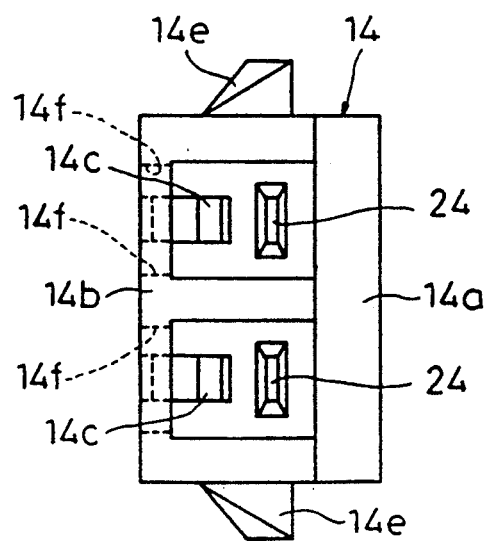
FIG. 6 is a plan view of the joining portion shown in FIG. 4.

As shown in FIGS. 4 to 6, the joining portion 14 has a primary wall 14a and an enclosure wall 14b both rising from the flange 11b, and an insertion hole 11c is bored through a portion of the flange 11b corresponding to a region enclosed by the primary wall 14a and the enclosure wall 14b. The enclosure wall 14b has a plurality of slits 14f and 14f cut in a lower portion thereof, thereby forming two elastic flaps 14c and 14c as illustrated, and a fixing claw 14d projects integrally from each elastic flap 14c. Engaging protuberances 14e and 14e jut out from both sides of the enclosure wall 14b, respectively.

The fixed case 12 cooperates with the base plate 13 to interpose the rotatable case 11 therebetween, as shown in FIG. 1, and rotatably supports the rotatable case 11 when these members are assembled. A fitting portion 12a protrudes radially outward from an outer peripheral surface of the fixed case 12, and a joint mold 21, mentioned later, of the flat cable 20 is fitted into the fitting portion 12a and fixed to a joining portion 15 of the base plate 13.

The base plate 13 comprises a ring-like plate member, and the joining portion 15 is formed on one side of the plate member for a connection with an external electric wire 30. The joining portion 15 has the same structure as the joining portion 14 formed on the rotatable case 11. Therefore, in FIG. 2, like reference numerals are used to denote parts corresponding to those of the joining portion 14, and a description of the joining portion 15 is omitted.

As shown in FIG. 1, the flat cable 20 is a flexible transmission line including a plurality of flat electrical conductors 20a covered with an insulating material 20b such as polyester or the like, and the joint molds 21 and 22 are attached to both ends of the flat cable, respectively. The joint molds 21 and 22 are made of synthetic resin and fix in position and electrically insulate a plurality of connection terminals 23 and 24 individually connected to the electrical conductors 20a of the flat cable 20. As seen from FIG. 1, the joint molds 21 and 22 are fitted into the joining portions 15 and 14 of the base plate 13 and the rotatable case 11, respectively, from above and from below, and are fixed to the respective joining portions.

Figure 3:
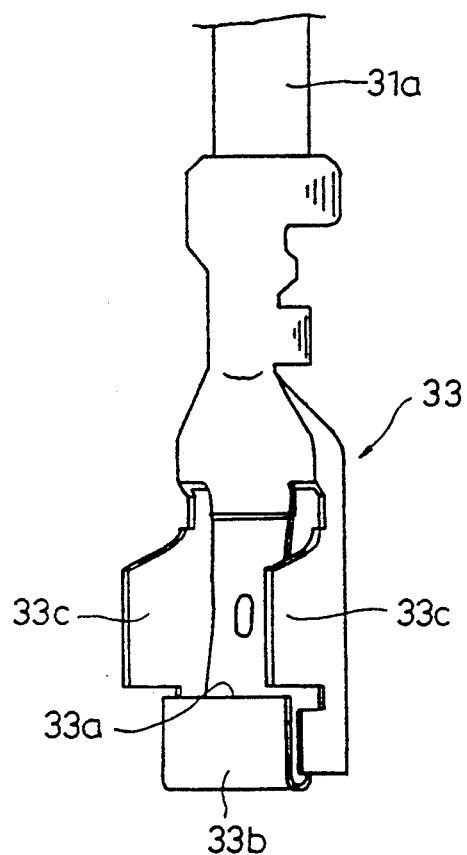
FIG. 3 is a perspective view of a terminal of an external electric wire which is connected to a joining portion formed on a rotatable case.
Figure 7:
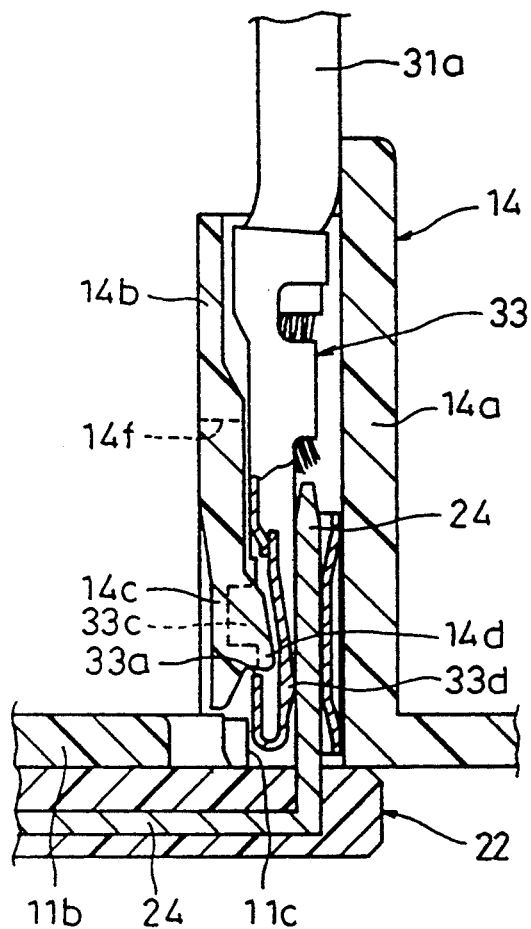
FIG. 7 is a sectional front view showing a state in which the terminal of the external electric wire is connected to the joining portion shown in FIG. 5.

The external electric wires 30 and 31 each comprise a wire harness for connecting the connector device 1 to an external device, and each include two lead wires, 30a and 31a, respectively covered with insulating tubes 30b and 31b. The lead wires 30a and 31a of the external electric wires 30 and 31 are unsheathed at one end, plug receptacles (hereinafter referred to as "terminals") 32 and 33 are attached to the respective unsheathed ends, and electric connectors 34 and 35 are individually connected to the other end of the corresponding electric wire. As shown in FIG. 3, the terminal 33 has an engaging opening 33a at a distal end portion thereof, which opening 33a is defined by a contact tongue 33b having an end thereof hooked and engaging lugs 33c and 33c on both sides of the contact tongue 33b. The contact tongue 33b has a protuberance 33d formed on a surface thereof at which the tongue contacts the connection terminals 24, as shown in FIG. 7. The terminal 32 has a structure similar to that of the terminal 33, and therefore, like reference numerals as shown in the figures are used in the following description.

To assemble the connector device 1, first, the joint mold 21 provided at one end of the spirally wound flat cable 20 is fitted into the joining portion 15 of the base plate 13 from above, the joint mold 22 provided at the other end of the cable is fitted into the joining portion 14 of the rotatable case 11 from below, and the rotatable case 11 is placed on the base plate 13, with the inner cylindrical shaft portion 11a passed through the center of the spirally wound flat cable 20.

Subsequently, the fixed case 12 is fitted on the structure from above, whereby the rotatable case 11 is interposed between the fixed case and the base plate 13, and the assembling of the connector device 1 is completed. Thus, in this connector device 1, the flat cable 20 is contained in the annular space of the casing 10, and the rotatable case 11 is held between the fixed case 12 and the base plate 13 and is allowed to rotate relative thereto as the flat cable 20 coils or uncoils.

Figure 2:
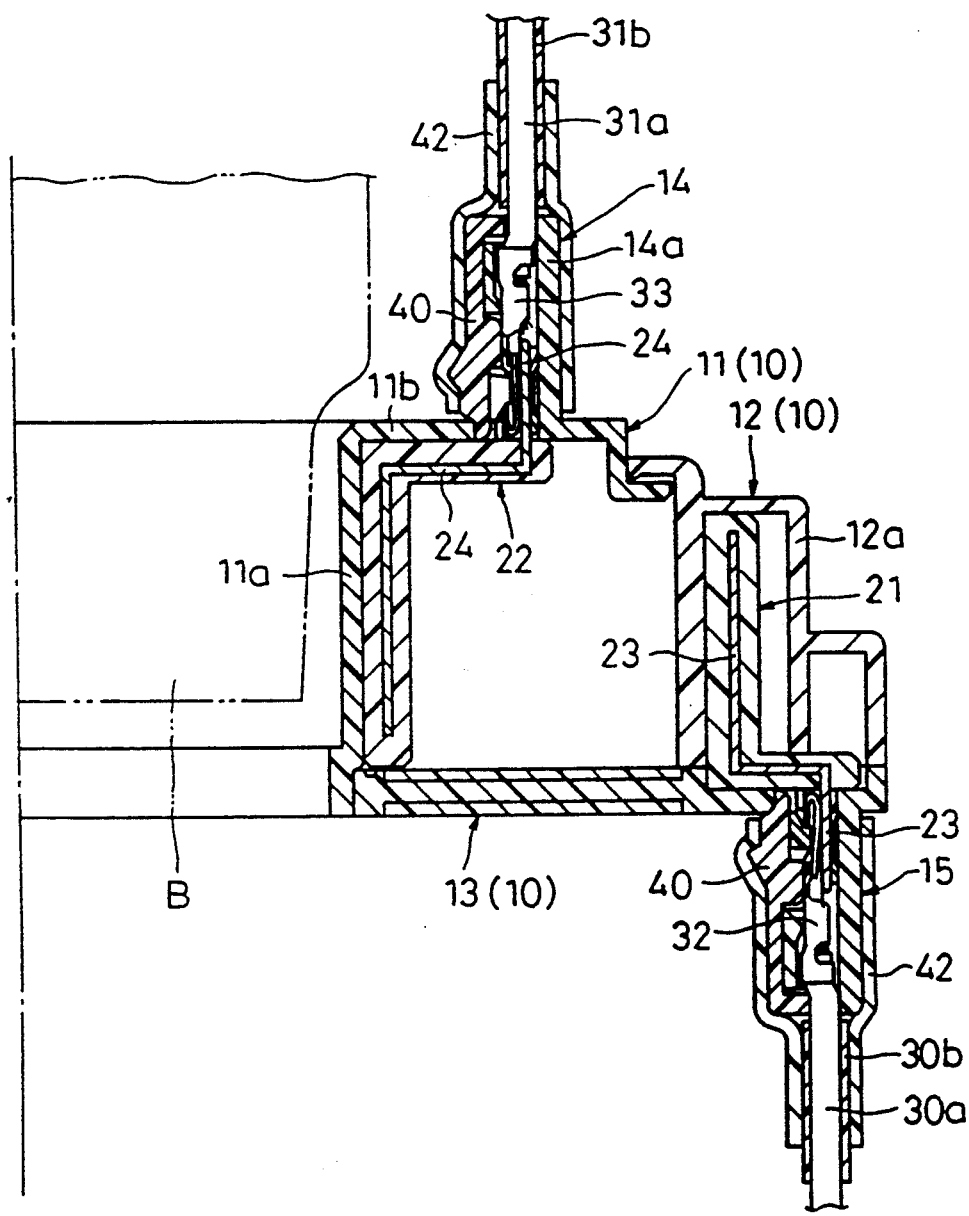
FIG. 2 is a mid-sectional front view showing a state in which the connector device shown in FIG. 1 is mounted to a steering apparatus.

The connector device 1 assembled in the above manner is mounted, e.g., to a steering apparatus of an automobile and connected to related external devices, and in this case, the external electric wires 31 and 30 are connected, respectively, to the joining portions 14 and 15, as shown in FIG. 2. In the figure, symbol B represents a boss of a steering wheel.

In this case, when the terminal 33 provided at the end of each load wire 31a, for example, is fitted into the joining portion 14, the terminal 33 is engaged with the connection terminal 24 of the joint mold 22 provided at the end of the flat cable 20 and thus is connected to the corresponding conductor 20a of the flat cable 20. Further, when the terminal 24 is engaged with the terminal 33, the fixing claw 14d of the elastic flap 14 fits in the engaging opening 33a of the terminal 33, whereby the terminal 33 is fixed in position with respect to the joining portion 14 and is prevented from being pulled out.

Figure 8:
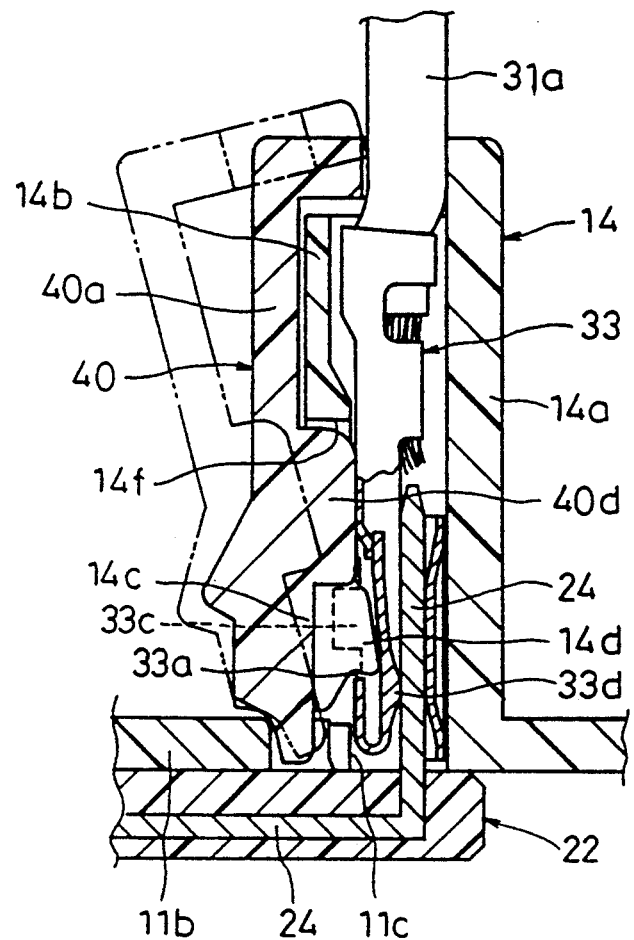
FIG. 8 is a sectional front view showing a state in which a cover is fitted to the joining portion shown in FIG. 7.
Figure 9:
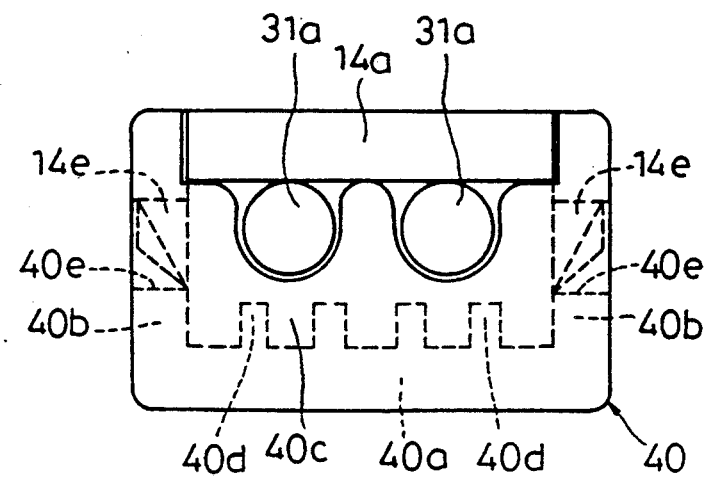
FIG. 9 is a plan view of the joining portion in FIG. 8 as viewed from above.

Then, as shown in FIG. 2, covers 40 and 40 are fitted to the joining portions 14 and 15, respectively, to enclose same from inside of the connector device 1. The covers 40 reinforce the junction between the terminals 23 and 32 and between the terminals 24 and 33 and protect the joining portions 14 and 15. As shown in FIGS. 8 and 9, the covers 40 each comprise a generally ⊔-shaped member having an urging portion 40a, side portions 40b and 40b on both sides of the urging portion 40a, an upper flange 40c, four urging plates 40d projecting from the inner surface of the urging portion 40a, and engaging holes 40e bored through the upper portions of the respective side portions 40b, and when the covers are fitted to the joining portions 14 and 15, the urging plates 40d fit into the respective slits 14f and 15f and engage with the upper portions of the engaging lugs 33c of the terminal 33. Consequently, the terminal 33 is still more firmly connected to the joining portion 14 and scarcely comes off therefrom. Further, when the covers 40 are fitted to the joining portions 14 and 15, the engaging protuberances 14e and 15e fit into the corresponding engaging holes 40e, and therefore, the covers 40 are prevented from being detached.

When attaching the cover 40 to, e.g., the joining portion 14, the cover 40 is first positioned obliquely, as indicated by the two-dot-chain line in FIG. 8, and then brought to an upright position. In this case, the lower end of the urging portion 40a of the cover 40 is fitted into the insertion hole 11c bored through the flange 11b of the rotatable case 11, and as the cover is raised, the fixing claws 14d of the elastic flaps 14c are pushed toward the connection terminals 24 due to the force produced according to the principles of the lever and fulcrum.

Consequently, each fixing claw 14d pushes the contact tongue 33b of the terminal 33 toward the connection terminal 24, whereby the pressure of contact between the connection terminal 24 and the terminal 33 is increased and an improved electrical connection is achieved.

Thereafter, dip covers 42 and 42 are capped on the joining portions 14 and 15, respectively, as shown in FIG. 2, to enclose the joining portions together with the covers 40, whereby the external electric wires 30 and 31 connected to external devices are attached.

Accordingly, in the connector device 1 of this invention constructed as above, since the joining portions 14 and 15 are provided respectively at the rotatable case 11 and the fixed case 12, the terminals 34 and 35 of the external electric wires 30 and 31 can be easily connected to the connection terminals 23 and 24 of the flat cable 20 by simply fitting the terminals 34 and 35 into the joining portions 14 and 15, respectively. Further, the junction between the terminals 23 and 32 and between the terminals 24 and 33 can be further reinforced by attaching the covers 40.

As described above, since the connector device 1 of this invention can be easily connected to external electric wires, even in the case wherein the connector device is to be mounted to a steering apparatus and thus the space available for the connection work with respect to external devices is small, the connector device can be easily connected to the external devices by using wire harnesses having terminals to be connected to the joining portions of the connector device.

In the above embodiment, the electrical conductors 20a of the flat cable 20 are connected to the terminals 32 and 33 of the external electric wires 30 and 31 via a plurality of connection terminals 23 and 24 connected to the individual electrical conductors. This invention, however, is not limited to such arrangement, and the electrical conductors 20a of the flat cable 20 may be extended into the joining portions 14 and 15 and connected directly to the terminals 32 and 33.

What is claimed is:

1. A connector device comprising:
   fixed and rotatable cases which are relatively rotatably combined with each other and which define therein an annular space;
   a flexible belt-shaped transmission line wound in a spiral form and housed in said annular space defined by said fixed and rotatable cases, said flexible belt-shaped transmission line including a plurality of electrical conductors covered with an insulating material;
   a joining portion formed at each of the rotatable and fixed cases for connecting the electrical conductors of said flexible belt-shaped transmission to a terminal attached to an external electrical conductor;
   said joining portion including a primary wall and an enclosure wall, said enclosure wall having a plurality of slits and elastic flaps, each flap having a fixing claw at an end thereof, the fixing claw of each flap engaging with the terminal of said external electrical conductor to prevent the terminal of said external electrical conductor from being pulled out of said joining portion.

2. The connector device of claim 1, further comprising a reinforcing member fitted to each of said joining portions, for reinforcing a junction between said electrical conductors of said flexible belt-shaped transmission line and said terminal of said external electrical conductor.

3. A connector device comprising:
   fixed and rotatable cases which are relatively rotatably combined with each other and which define therein an annular space;
   a flexible belt-shaped transmission line would in a spiral form and housed in said annular space defined by said fixed and rotatable cases, said flexible belt-shaped transmission line including a plurality of electrical conductors covered with an insulating material;
   a joining portion formed at each of the rotatable and fixed cases for connecting the electrical conductors of said flexible belt-shaped transmission to a terminal attached to an external electrical conductor; and
   a reinforcing member fitted to each of said joining portions, for reinforcing a junction between said electrical conductors of said flexible belt-shaped transmission line and said terminal of said external electrical conductor.

* * * * *